Jan. 15, 1963   C. J. CISLO   3,073,525
AUTOMATIC VENTILATOR FOR BUILDINGS
Filed Jan. 3, 1961
2 Sheets-Sheet 1

INVENTOR.
BY CASIMER J. CISLO
ATTORNEY

Jan. 15, 1963  C. J. CISLO  3,073,525
AUTOMATIC VENTILATOR FOR BUILDINGS
Filed Jan. 3, 1961  2 Sheets-Sheet 2

INVENTOR.
BY CASIMER J. CISLO
ATTORNEY

United States Patent Office 3,073,525
Patented Jan. 15, 1963

3,073,525
AUTOMATIC VENTILATOR FOR BUILDINGS
Casimer J. Cislo, Southfield, Mich., assignor to Thermvent Corporation, Detroit, Mich., a corporation of Michigan
Filed Jan. 3, 1961, Ser. No. 80,065
3 Claims. (Cl. 236—49)

This invention relates to an automatic ventilator, and more particularly an automatic sliding type thermostatically operated ventilator, particularly adapted for use with buildings and homes such as for crawl space installation, for attics, gables, roofs, walls or for soffit ventilation, or anywhere in a building where ventilation control is required.

Heretofore, in areas as above identified with respect to buildings louvred openings of one sort or another has been provided for the purpose of ventilation. It is contemplated, however, as a part of the present invention and as a primary object thereof that there be an improved automatic control means for regulating opening and closing of the said ventilator in response to temperature conditions. For example, it is contemplated that a ventilator will open when the temperature reaches a predetermined point for good air circulation for cooling purposes, and will automatically close if the temperature drops back to a certain predetermined point.

It is the primary object of the present invention to provide an automatic thermostatically controlled ventilator for buildings which will have simplicity of operation and ease of assembly due to a minimum number of component parts.

It is a further object to provide a simplified construction which eliminates riveting, linkages, levers, etc. or other costly means of assembly thus materially contributing to a reduced cost of manufacture.

It is a further object to provide a self-contained thermostatic element in conjunction with a slider control for a ventilating grille and wherein when the temperature of the atmosphere rises to a certain point the said grille is opened to the passage of air therethrough and wherein the thermostatic element responds to temperature changes so that upon the dropping of the temperature to or beyond a certain point the said slider controlling the openings of the grille will automatically close.

These and other objects will be seen from the following specification and claims in conjunction with the appended drawings in which:

It will be understood that the above drawings illustrate merely a preferred embodiment of the invention, and that other embodiments are contemplated within the scope of the claims hereafter set forth.

The present invention is directed to a construction which includes an apertured grille mountable upon some portion of a building such as an attic, gable, roof, wall, ceiling or soffit and which includes a slider or apertured member normally registerable with the apertures of the grille for closing same and which is longitudinally movable under the action of a thermostatic control, which includes a pellet of a self-contained nature directly responsive to temperature changes and with expansion or contraction of the said pellet causing longitudinal movement of a piston rod connected therewith and extending from the thermostat housing mounted upon the slider mechanism whereby the said piston rod operatively engages a portion of the grille frame for thus imparting motion to the slider on expansion of the said pellet in response to increased temperature conditions.

The present invention also contemplates a spring normally urging the slider control for the grille into closed position whereby the said grille will be closed on return movement of the said slider on contraction of the pellet due to a drop of temperature conditions.

Figure 1:
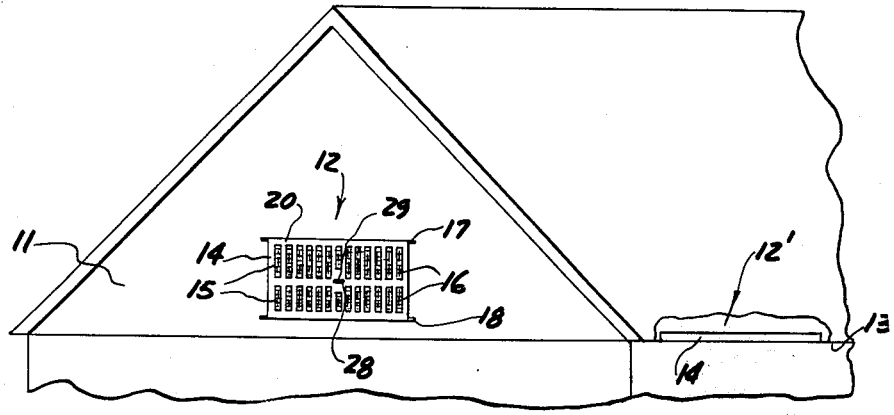
FIG. 1 is a fragmentary perspective view of a gable portion of a building illustrating the mounting of the present automatic ventilator therefor.

Referring specifically to the drawings, a building gable, for illustration is indicated at 11 in FIG. 1; upon the upright wall portion thereof there is fixedly mounted an automatic ventilator generally indicated at 12. A form of soffit is generally indicated at 13 for the building with respect to which an additional automatic ventilator is mounted as at 12′ in FIG. 1 for the purpose of illustrating the several usages of the present ventilator.

It is contemplated, however, that the present ventilator may be used at any portion of a building wherein ventilation is desired, as for example, a roof, a wall, or any other portion such as a crawl space at the base of a building, or used on trailers.

Figure 2:
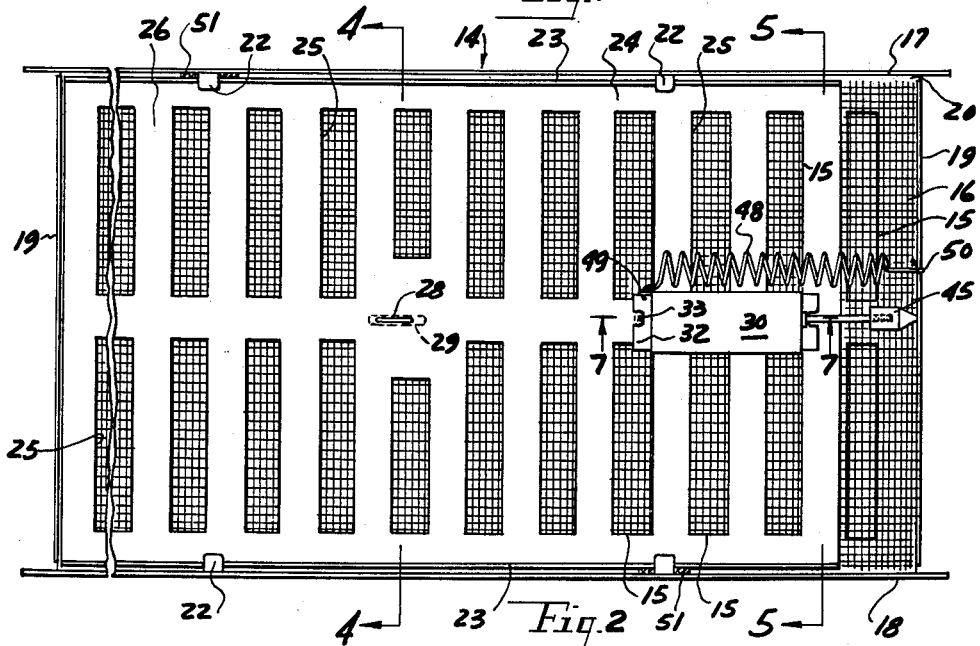
FIG. 2 is a rear elevational view of the present ventilator illustrating a grille frame and the slider thereon.

The present automatic ventilator includes a preferably metallic grille frame 14 of elongated rectangular shape, for illustration, having formed therethrough a series of spaced apertures 15 normally covered on the interior of the grille frame by a suitable screen 16, as shown in FIG. 2, which is a rear elevational view of the automatic ventilator shown in FIG. 1.

FIG. 2 shows the slider 24 moved to an open position out of registry with the respective apertures 15 formed in the grille frame, as hereafter described.

The present grille frame includes rearwardly extending, horizontally disposed top and bottom flanges 17—18 as well as the rearwardly extending right angular end flanges 19 which provide the means for assembling the present grille frame within a portion of the building construction and for securing thereto.

Figure 8:
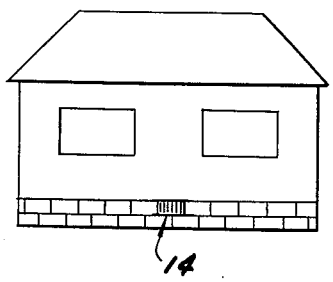
FIG. 8 is a side elevation of a building with the ventilator connected with the crawl space thereof.

Said flanges are designed for use with building blocks, such as for the crawl space of a building shown at 14, FIG. 8.

The present grille frame generally indicated at 14 includes the front face 20 through which are formed the series of apertures 15 above described for permitting the passage of ventilating air to the interior of the building construction.

The respective top and bottom flanges 17—18 have U-shaped scorings 21 from which are formed the inwardly directed retaining tabs 22 adapted to slidably and retainingly engage the inwardly directed top and bottom flanges 23 of slider plate 24.

Said slider plate also has formed therethrough a series of transverse apertures 25 which correspond in shape and location to the respective apertures 15 formed within the grille frame 20 so that with the slider 24 moved to the right from the position shown in FIG. 2 the closed portions 26 thereof will be in registry with the corresponding apertures 15 of the grille frame for the purpose of closing off air communication to the interior of the building.

Referring to FIG. 2, the slider plate 24 at a central portion thereof has a short longitudinal slot 28 in registry with a corresponding longitudinal slot 29 in the front face of the grille frame 14 to provide for manual sliding control of the slider, as desired. This may be accomplished merely by inserting an object such as a screw driver through slot 29 and into slot 28 by which plate 24 may be moved. This may be particularly advantageous if for some reason the thermostatic control becomes inoperative. In this case all that will be necessary is to disconnect the return spring hereafter described so that the slider could be manually moved to a desired opened position.

Figure 7:
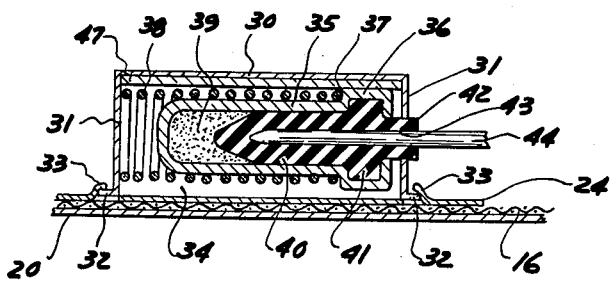
FIG. 7 is a fragmentary section taken on line 7—7 of FIG. 2, but on an increased scale.

Referring now to FIGS. 2 and 7, the present automatic ventilator includes a thermostat housing 30 which is closed on all sides except for the bottom as at 34 and which includes the end walls 31 terminating in the outwardly extending mounting tabs 32. Portions of the slider body 24 are scored and formed into retaining tabs 33 which operatively and retainingly engage central portions of the housing tabs 32 for anchoring the said thermostat housing upon a portion of the slider adjacent one end thereof as specifically shown in FIG. 2.

The present thermostatic control is in the form of a capsule which includes an elongated housing 35, FIG. 7, which may be a casing and which may be constructed of metal, plastic or any other suitable material. The elongated housing 35 has at one end the enlarged collar portion 36 adapted to retainingly receive the corresponding annular collar 41 upon the end portion of the flexible preferably rubber or equivalent piston or closure 40 which is snugly nested upon the interior of the said housing 35.

The present capsule housing contains therein between one end wall thereof and a corresponding wall of the rubber piston 40 a gelatinous substance 39, being a material which is readily responsive to changes in temperature and which will expand in volume upon the application of heat.

The present capsule 35 also includes, nested within the piston 40, the longitudinally movable piston rod 44 which projects outwardly through the reduced apertured end 42 of the said piston. The piston 40 has a longitudinal bore, as at 43, into which one end of the piston rod 44 is snugly projected and retained. It is understood that the design is not necessarily confined to this type element. Other types of thermostatic elements are commercially available and will perform satisfactorily. It is contemplated that any such element responsive to temperature changes may be used.

The above described annular shoulder 37 forming a part of the capsule housing 35 provides a retaining shoulder adapted to cooperatively receive one end of the coiled spring 38 which is normally under compression and wherein the opposite side of said spring operatively engages one of the end walls 31 of the thermostat housing. Accordingly the said capsule housing 35 is normally urged and maintained in the position shown in FIG. 7.

At a predetermined atmospheric temperature and expansion of the gelatinous substance 39, the piston rod 44 will in effect exert a longitudinal force with respect to the adjuster 45 with the result that the reaction pressure is transmitted to the thermostat housing, through the coiled spring 38, causing the said housing to move to the left with respect to the grille frame 14.

Such an adjusted position is shown in FIG. 2 wherein, upon response to a predetermined temperature, as for example 70 degrees F., the slider will have moved to the position shown in FIG. 2 so that the closed portions 26 thereof will have uncovered the apertures 15 in the front face of the grille frame to thus permit the flow of ventilating air in the interior of the building.

As shown in FIG. 7, the walls of the housing 30 may be insulated by a layer of insulating material such as asbestos layer 47, whereby the inside of the housing 30 can be insulated to favor inside or outside temperature conditions or set up to react to both conditions.

A return spring 48 is shown in FIG. 2 anchored at one end at 49 to a portion of the thermostat housing 30 and at its opposite end anchored as at 50 to a portion on the flange of the grille frame 14. Accordingly upon contraction, due to reduced temperature conditions, of the gelatinous substance 39 of the capsule, the coil spring 48 will be effective for returning the slider 24 to closed position cutting off the further flow of atmospheric ventilation into the portion of the building.

The above described thermostatic control device hereafter refered to in the claims as a thermostatic control means, includes as a part thereof, a capsule having a body 35 within which is positioned the yieldable piston rod 40, preferably of rubber, whose outer portion is anchored within the said capsule body, but which includes an internal movable member which acts in reponse to expansion and contraction of the gelatinous substance 39 within the said capsule.

The structure of the present thermostatic control capsule is not a part of the present invention, but may be said to be purchased on the market and accordingly a further specific description of said capsule is omitted. It is believed sufficient for the purpose of this application to indicate that the said capsule is a thermostatic type of capsule which responds to the application of heat and includes a longitudinally movable piston rod 44 which is secured to and extends longitudinally within a portion of the piston 40 and is adapted on expansive movement of the substances within the capsule to effect a longitudinal movement.

Inasmuch as the piston rod 44 at its outer end as at contact points 45—46 is retained against longitudinal movement, it follows that the reaction movement is thus transmitted to the capsule housing iself as at 35. This reaction movement is transmitted through the compressed coil spring 38 to the housing 30 which in turn transmits a longitudinal rectilinear motion to the shutter or slider 24 thus causing opening movement of the said shutter to the position shown in FIG. 2. In other words the coiled spring 38 takes up the initial thrust applied to the capsule housing 35 due to the reaction applied form the piston rod 44, after which the longitudinal movement is transmitted to the said housing 30 and thence to the shutter 40 for opening the same.

For the reverse operation, upon a cooling down of surrounding temperature conditions, the substance upon the interior of the capsule contracts to a point that the rubber piston 40 returns to its normal position due to its inherent resiliency and due to the fact that the outer portion of he piston is anchored at 41. At the same time the coiled spring 48 shown in FIG. 2 is effective for urging the slider or shutter back to the initial closure position thereof wherein portions of the said shutter closing the apertures 15 in the grille frame.

Figure 3:
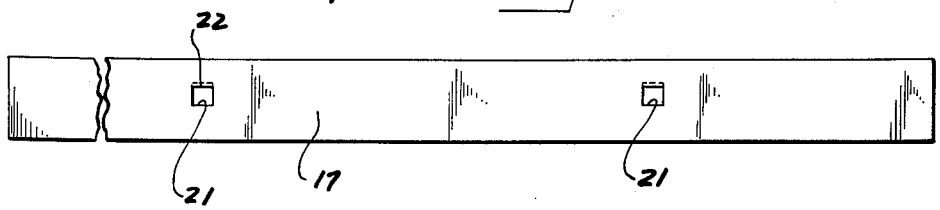
FIG. 3 is a plan view thereof
Figure 4:
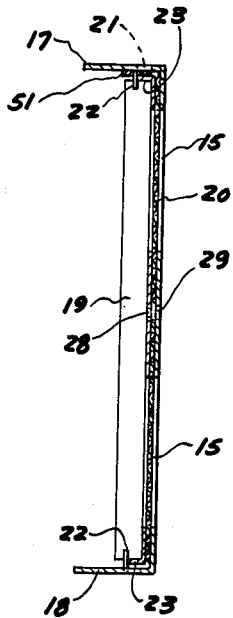
FIG. 4 is a section taken on line 4—4 of FIG. 2
Figure 5:
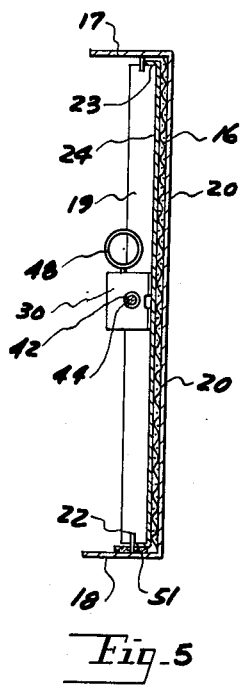
FIG. 5 is a section taken on line 5—5 of FIG. 2
Figure 6:
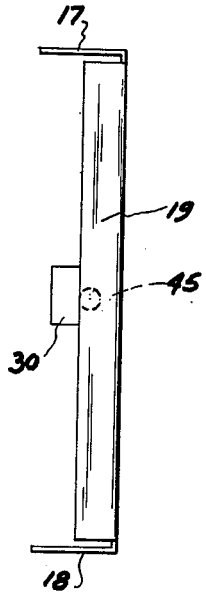
FIG. 6 is an end view of FIG. 2

Referring to FIGS. 3, 4 and 5, fibre washers 51 are diametrically positioned over tabs 22 for the purpose of preventing a binding action between the slidable plate 24 and the top and bottom flanges 17 and 18 due to the action of spring 48.

It must be understood that the present design is not necessarily confined to the above construction shown, for illustration. The system may be reversed by simply mounting the thermostat and thermostat housing upon the grille frame with the piston 45 operatively engaging the slider 24. It is understood that for this particular application, the power element housing is responsive to outside temperatures for actuation. It is contemplated that for other applications housing 30—31 may be apertured so as to expose the thermostatic element to inside temperatures.

Having described my invention, reference should now be had to the following claims.

I claim:

1. In an automatic ventilator for a building having a vent opening, a grille frame adapted to be mounted in said opening and having a plurality of openings therein, an apertured shutter slidably mounted upon said grille frame normally closing said grille frame openings, thermostatic control means operatively mounted between said grille frame and shutter for selectively opening and closing said shutter at determined temperatures, said thermostatic control means including a housing mounted on said shutter longitudinally and at one end thereof, a temperature sensitive power element mounted within said housing including a closure piston and a connected pistor rod projecting from said power element and housing operatively engaging said grille frame, said power element containing a temperature responsive substance expansive on the application of heat for effecting longitudinal movement of said rod in one direction to open the shutter at one temperature, and contractible at a reduced temperature for effecing movement of said rod in the opposite direction, and a coiled spring interposed in tension between said frame and shutter for closing said shutter at a second temperature.

2. In an automatic ventilator for a building having a vent opening, a grille frame adapted to be mounted in said opening and having a plurality of openings therein, an apertured shutter slidably mounted upon said grille frame normally closing said grille frame openings, thermostatic control means operatively mounted between said grille frame and shutter for selectively opening and closing said shutter as determined temperatures, said thermostatic control means including a housing mounted on said shutter longitudinally and at one end thereof, a temperature responsive means in said housing including a reciprocal piston rod projected longitudinally from said housing for operative engagement with said grilled frame, movable in one direction for opening the shutter, and a coiled spring interposed between said shutter and frame for closing said shutter on movement of said rod in the opposite direction.

3. In an automatic ventilator for a building having a vent opening, a grille frame adapted to be mounted in said opening and having a plurality of openings therein, an apertured shutter slidably mounted upon said grille frame normally closing said grille frame openings, thermostatic control means operatively mounted between said grille frame and shutter for selectively opening and closing said shutter at determined temperatures, said thermostatic control means including a housing mounted on said shutter longitudinally and at one end thereof, a temperature response means in said housing including a reciprocal piston rod projected longitudinally from said housing for operative engagement with said grille frame movable in one direction for opening the shutter, a coiled spring interposed between said shutter and frame for closing said shutter on movement of said rod in the opposite directions, and spring means interposed between one end of said housing and the end of said temperature responsive means opposite from said piston rod, whereby the reaction pressure of said rod upon said frame is transmitted through said spring means and housing to said shutter.

References Cited in the file of this patent

UNITED STATES PATENTS

| | | |
|---|---|---|
| 2,537,315 | Newton | June 9, 1951 |
| 2,584,305 | Taylor | Feb. 5, 1952 |
| 2,970,768 | Curran | Feb. 7, 1961 |
| 2,975,975 | Weber | May 21, 1961 |
| 2,987,138 | Walton | June 6, 1961 |

FOREIGN PATENTS

| | | |
|---|---|---|
| 4,409 | Great Britain | 1888 |